D. A. WELLS.
Cheese-Protectors.
No. 168,437. Patented Oct. 5, 1875.
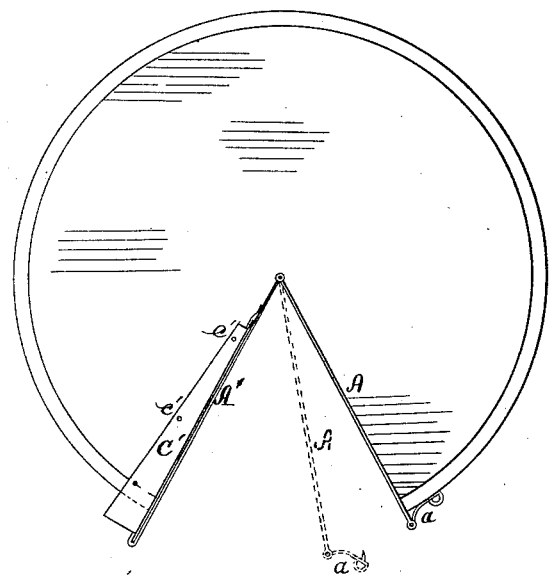
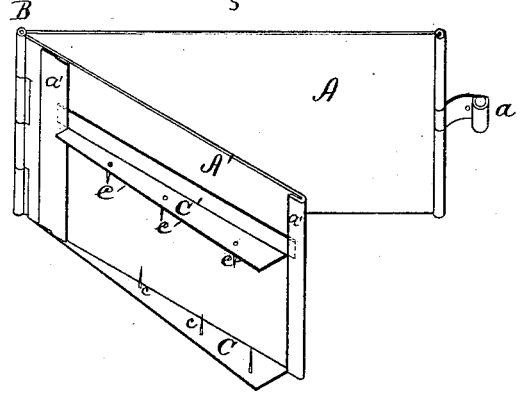
Witnesses
Walter Miller
T. B. Hall
Inventor
Daniel A. Wells,
By Leggett & Leggett
Attorneys

UNITED STATES PATENT OFFICE.

DANIEL A. WELLS, OF MEDINA, OHIO, ASSIGNOR TO JOHN A. BRADLEY, OF SAME PLACE.

IMPROVEMENT IN CHEESE-PROTECTORS.

Specification forming part of Letters Patent No. 168,437, dated October 5, 1875; application filed March 15, 1875.

*To all whom it may concern:*

Be it known that I, DANIEL A. WELLS, of Medina, in the county of Medina and State of Ohio, have invented certain new and useful Improvements in Cheese-Protectors; and I do hereby declare the following to be a full, clear, and exact description of the invention, such as will enable others skilled in the art to which it pertains to make and use it, reference being had to the accompanying drawings, which form part of this specification.

My invention relates to a cheese-protector; and consists, essentially, in a hinged device with two leaves or faces, the said device being inserted in the notch or gore from which a piece of cheese has been removed. It is opened out until its faces or leaves lie against the fresh-cut surfaces, in which position it may or may not be secured, as hereinafter more fully set forth and claimed.

In the drawings, Figure 1 is a plan view of a cheese with one form of my cheese-protectors attached. Fig. 2 is a separate view of the form of my cheese-protector, as shown in Fig. 1.

When a piece is cut from a cheese that surface adjacent to the cut rapidly deteriorates, and becomes dry and stale. So, also, unless carefully protected, it gathers dirt, and it is also quite difficult in stores where cheese is sold to prevent customers from cutting off small portions of the cheese, whereby it is damaged in general appearance, and considerable loss ensues, both from the portions that are removed and from the damaged condition.

My invention is designed to overcome these difficulties, and preserve the cheese fresh and clean, while at the same time nibbling by customers is avoided.

A and A are two flat wings or leaves hinged together at B. C is a flat surface provided with points $c$, that press up into the cheese. C' is a movable sliding jaw, provided with points $c'$, that press down into the cheese from above. By the adjustability of the movable jaw C' the machine is suited to cheeses of any thickness. So, also, the leaves A A' are made long enough and broad enough to suit cheeses of any diameter or thickness.

Upon the wing A is a latch or catch, $a$, whereby the wing A may be locked firmly against the fresh surface of the cheese.

The operation of the device is as follows: A V or other shaped piece having been cut out of the cheese for the first time, my protector is inserted so that the hinged portion B shall be at the bottom of the gore, ordinarily the center of the cheese. One side of the fresh-cut portion, if desired, is then clamped securely between the jaws C and C', with the surface A' resting against it. The movable wing or leaf A is then opened out until it comes in contact with the other side or fresh surface of the gore. The little catch $a$ may then be pressed into the cheese, and serves to hold the wing A securely in place. When it is desired to cut away another slice from the cheese the catch $a$ is again loosened, the leaf A is turned back, and the slice is cut away, after which the leaf A is turned again until it comes against the new-cut surface, and is again secured by the catch $a$.

I do not limit myself to the exact form of surface here shown, nor do I limit myself to the peculiar method of attaching the said protector to the cheese, because it may be effected in many other ways than by the two jaws C and C' without departing from the principle of my invention.

So, also, I do not limit myself to making the device adjustable, because it is evident that at a trifling expense the device may be suited directly to any particular size of cheese.

But I am not aware that a cheese-protector has ever before been made to be inserted in the gore from which a slice has been removed, so that the surfaces of the protector shall lie flat against the fresh-cut surfaces, and thereby preserve those surfaces from deterioration, as well as to prevent persons from meddling therewith.

So, also, it is apparent that it is not absolutely essential that the flat surfaces A and A' should lie flat against the fresh-cut surface, but if they are formed in any manner so that they will close up toward or against the surface in any manner, so as to exclude the air, they will still involve the principle of my invention, which, broadly considered, is a device the surfaces of which are designed to close in from the air and protect the fresh-cut surfaces of the cheese.

$a'$ are guides, of any suitable nature, in which the movable jaws $C'$ traverse. This movable jaw may be in the form shown, or it may be in any other suitable form; but I deem the sliding jaw and its arrangement, as here shown, to be very simple and effective.

What I claim is—

1. A device for protecting the cut or broken surfaces of a cheese, consisting in an implement constructed to be inserted into the cut or broken opening of the cheese, and provided with wings A A', of a form to exclude air from said exposed cut or broken surfaces, and adapted to be held and retained in proper juxtaposition to said exposed surfaces, substantially as and for the purposes shown.

2. The cheese-protector, consisting of wings A A' and hinge B, and a suitable device for holding said wings against the cut or broken surfaces, substantially as and for the purpose described.

3. The combination of the wing A', having the fixed jaw C with points $c$, and the movable jaw C' with points $c'$, the last-named jaw sliding in the ways $a'$ formed on the wing A'.

4. The combination, with the wing A', of the jaw C and points $c$, substantially as and for the purpose described.

5. The combination, with the wing A', of the jaw C and adjustable jaw C', substantially as and for the purpose described.

6. The combination, with the movable wing A, of a catch, $a$, whereby the said wing can be readily adjusted to a fresh-cut surface, or readily detached to admit of cutting away more of the cheese, substantially as and for the purpose described.

In testimony whereof I have signed my name to this specification in the presence of two subscribing witnesses.

DANIEL A. WELLS.

Witnesses:
FRANCIS TOUMEY,
H. T. HOWER.